(12) United States Patent
Kagoshima et al.

(10) Patent No.: US 7,569,656 B2
(45) Date of Patent: Aug. 4, 2009

(54) PROCESS FOR PRODUCTION OF POLYARYLENE SULFIDE

(75) Inventors: Masaru Kagoshima, Fukushima (JP); Mitsuhiro Matsuzaki, Fukushima (JP)

(73) Assignee: Kureha Corporation, Tokyo (JP)

( * ) Notice: Subject to any disclaimer, the term of this patent is extended or adjusted under 35 U.S.C. 154(b) by 31 days.

(21) Appl. No.: 10/490,719

(22) PCT Filed: Sep. 27, 2002

(86) PCT No.: PCT/JP02/10053

§ 371 (c)(1), (2), (4) Date: Mar. 25, 2004

(87) PCT Pub. No.: WO03/029328

PCT Pub. Date: Apr. 10, 2003

(65) Prior Publication Data

US 2004/0249118 A1    Dec. 9, 2004

(30) Foreign Application Priority Data

Sep. 27, 2001    (JP) .............................. 2001-296545

(51) Int. Cl.
C08G 75/14    (2006.01)
(52) U.S. Cl. ...................... 528/381; 528/388; 528/503
(58) Field of Classification Search ...................... None
See application file for complete search history.

(56) References Cited

U.S. PATENT DOCUMENTS 5,475,081 A * 12/1995 Imai et al. .................. 528/388
6,939,941 B2 * 9/2005 Gilmore et al. ............. 528/389
2002/0147299 A1 * 10/2002 Koyama ..................... 528/373
2005/0215759 A1 * 9/2005 Matsuzaki et al. .......... 528/373

FOREIGN PATENT DOCUMENTS

| EP | 0598449 | 11/1993 |
| EP | 0667368 | 2/1995 |
| JP | 62-285922 A * | 12/1987 |
| JP | 02-160833 A * | 6/1990 |
| JP | 07-010997 | 1/1995 |
| JP | 2604673 | 1/1997 |
| JP | 2604674 | 1/1997 |
| JP | 09-296042 | 11/1997 |
| JP | 10-087831 | 4/1998 |
| JP | 2000191785 | 7/2000 |
| JP | 2001089569 | 4/2001 |

* cited by examiner

Primary Examiner—Marc S Zimmer
(74) Attorney, Agent, or Firm—Porter Wright Morris & Arthur LLP

(57) ABSTRACT

There is provided a method for producing a poly(arylene sulfide) in which a dihalo-aromatic compound and an alkali metal halide are polymerized by heating in an organic amide solvent, wherein the cooling time for the polymerization reaction system is significantly reduced. After the polymerization process, there is provided a cooling process for cooling the polymerization reaction system comprising a liquid phase containing the product poly (arylene sulfide) and the organic amide solvent and a vapor phase containing a gas component (A); and in the cooling process, the gas component (A) in the vapor phase is cooled while the content of a low boiling gas component (A1), which has a lower boiling point than water and exists in the gas component (A), is reduced in the vapor phase of the polymerization system.

16 Claims, 1 Drawing Sheet

PROCESS FOR PRODUCTION OF POLYARYLENE SULFIDE

TECHNICAL FIELD

The present invention relates to a method for producing a poly(arylene sulfide) (hereinafter abbreviated as "PAS"), and more particularly to a method for efficiently and economically producing a PAS by rapidly cooling a polymerization reaction system after a polymerization process of the PAS.

BACKGROUND ART

A PAS typified by polyphenylene sulfide (hereinafter abbreviated as "PPS") is an engineering plastic excellent in heat resistance, chemical resistance, flame retardancy, mechanical strength, electrical properties, dimensional stability and the like. The PAS can be molded to various moldings, films, sheets, fibers and the like by typical melt processing methods such as extrusion molding, injection molding, compression molding and the like. In addition, the PAS can be used for coatings on other materials such as metal. Therefore, the PAS is used in wide application fields such as electric and electronic equipment and automobile equipment.

A PAS is generally produced by a method in which a dihalo-aromatic compound and an alkali metal sulfide are polymerized (polycondensed) by heating in an organic amide solvent. A polymerization aid, a phase separation agent or the like is added as required before the polymerization process, during the polymerization process or after the polymerization process.

Various additional processes are provided before and after the polymerization process of PAS. The polycondensation reaction of a dihalo-aromatic compound and an alkali metal sulfide is susceptible to water, but the alkali metal sulfide as a raw material contains much amount of water such as the water of crystallization in many cases. Therefore, before the polymerization process of PAS, there is generally provided a dehydration process in which the water in the reaction system is adjusted by distilling water out of a mixture containing an organic amide solvent and an alkali metal sulfide. After the polymerization process, there is provided a process in which the polymerization reaction system is cooled and the PAS produced is recovered from the polymerization reaction system.

Since the polycondensation reaction between a dihalo-aromatic compound and an alkali metal sulfide is a salt elimination reaction, a large amount of alkali metal halides (for example, NaCl) is formed as a by-product. In a recovery process, a reaction mixture containing the PAS produced and a large amount of byproducts is filtered, and then a resultant solid matter is washed to remove byproducts or oligomers mixed in or attached to the PAS. The thus recovered PAS is dried in a drying process. Further, there is also provided a process to recover an organic amide solvent, an unreacted monomer and the like.

In the initial stage of the development of PAS, there has been adopted a method of rapid cooling by removing a solvent by a solvent flashing process from a polymerization reaction system that is heated to high temperatures and in a high-pressure state, after the polymerization process. However, it is difficult to remove the byproducts and oligomers from the PAS by operations such as filtration and washing because the PAS is precipitated as fine powders, in the solvent flashing process. Further, the powdered PAS is difficult in handling and measurement.

Therefore, at present, there is adopted a method in which a slurry containing a granular PAS is formed by reducing the temperature of the reaction mixture containing an organic solvent, a PAS, a byproduct, a phase separation agent and the like, wherein the PAS is in a molten state, after the polymerization process. The phase separation agent has an effect to induce liquid—liquid phase separation in the reaction mixture in a high-temperature state, producing an organic amide solvent phase and a molten PAS phase. Organic carboxylic acid salts, water and the like are used as the phase separation agent. According to this method, a granular PAS can be recovered. The granular PAS is easy in separation of byproducts and oligomers and excellent in handling and measurement.

However, a method for reducing the temperature of a reaction mixture in a high-temperature state after a polymerization process requires a long cooling process, so the method has problems that the production efficiency is low and it is not economical. Therefore, several methods are proposed in order to produce a high-purity granular PAS in a relatively short cooling time.

Japanese Patent Laid-Open No. 2001-89569 proposes a method in which a polyhalogenated aromatic compound and a sulfidizing agent are subjected to polymerization reaction in a temperature range of 245 to 290° C., and then the reaction mixture is cooled in a two-step cooling rate in a cooling process. Specifically, it proposes a method in which the reaction mixture is first cooled at a cooling rate of 0.2 to 1.3° C./minute and, after reaching a specific temperature, at a cooling rate of higher than 1.3° C./minute. Its example shows an experimental example in which the reaction mixture was cooled at a cooling rate of 1° C./minute to 198° C. and then at a cooling rate of 2° C./minute to 50° C. The above patent describes that the method has provided a highly pure PAS in a short polymerization process time. However, this method cannot significantly reduce the cooling time.

Japanese Patent Laid-Open No. 10-87831 proposes a method for producing a granular PPS in which a sulfur source and a polyhalo-aromatic compound are subjected to polymerization reaction in an organic polar solvent in a sealed vessel and the reaction mixture is gradually cooled in the later stage of the polymerization reaction. According to the production method, the reaction mixture is gradually cooled in the later stage of the polymerization reaction, and the pressure of the vessel is relieved in a state where at least 50% by mole relative to the charged sulfur source of the polymer exists as a solid granular polymer and the pressure within the sealed vessel is $0.39 \times 10^6$ Pa or higher. Thus, a polymerization reaction mixture composed of a gas phase and a liquid phase is degassed and the pressure within the vessel is reduced. The above patent also describes that liquid—liquid phase separation is induced in a liquid phase component before cooling. This cooling method requires a gradual cooling, for example, at a cooling rate of about 1° C./minute, so it is difficult to substantially reduce the cooling time. Further, when the amount of water to be evaporated out of the gas phase by the degassing is large, this method requires a degassing time corresponding to the large amount of water.

Japanese Patent Laid-Open No. 09-296042 proposes a method for producing a PAS by reacting a dihalo-aromatic compound with a sulfidizing agent in an organic polar solvent. In the method, after the completion of the reaction, water is removed from a reaction slurry at a temperature lower than the temperature at the completion of the reaction and higher than the temperature where a polymer is precipitated, and then the reaction slurry is cooled to precipitate the polymer. The example in the above patent describes that after the completion of the reaction, the reaction mixture is cooled from 250° C. to 230° C. in 10 minutes; a water-NMP (N-methyl-2-pyrolidone) mixture is evaporated in 30 minutes while maintaining this temperature; and then the reaction mixture is cooled at a rate of 1° C./minute to 150° C. However, this method requires that water needs to be evaporated while maintaining the temperature where PPS is not precipitated, and also the reaction mixture needs to be gradually cooled at a cooling rate of 1° C./minute.

Japanese Patents No. 2604673 and No. 2604674 propose a method for producing a PAS by reacting an alkali metal sulfide with a dihalo-aromatic compound in an organic amide solvent, wherein a liquid phase is heated to a temperature exceeding the temperature of the liquid phase under the atmospheric pressure and a vapor phase part in a closed reactor is cooled, thereby condensing part of the vapor phase in the reactor and refluxing the condensate back into the liquid phase.

The method described in these patents is intended to return a large amount of reflux with a high water content back into the upper part of a liquid phase to form a layer with a high water content and to allow the layer to contain a residual alkali metal sulfide, a halogenated alkali metal, an oligomer and the like in the liquid phase. Therefore, this method is not a method for cooling a polymerization reaction system containing a liquid phase. These patents describe that during the cooling of the upper part of a reactor, a liquid temperature is maintained constant so that it is not reduced. Actually, cooling of a vapor phase only by this method cannot effectively cool the entire polymerization reaction system containing a liquid phase.

DISCLOSURE OF THE INVENTION

It is an object of the present invention to provide a method for efficiently and economically producing a poly(arylene sulfide) by rapidly cooling a polymerization reaction system after a polymerization process of the poly(arylene sulfide).

More specifically, it is an object of the present invention to provide a method for producing a poly(arylene sulfide) in which a dihalo-aromatic compound and an alkali metal sulfide are polymerized by heating in an organic amide solvent, wherein after a polymerization process, there is provided a cooling process for cooling a polymerization reaction system comprising a liquid phase containing the poly(arylene sulfide) produced and the organic amide solvent and a vapor phase containing a gas component, and the cooling process can be effectively implemented.

After the polymerization process, the polymerization reaction system comprising a liquid phase and a vapor phase is in a high-temperature and high-pressure state in a closed polymerizer. The liquid phase contains an organic amide solvent, a PAS produced, a halogenated alkali metal, additives such as a phase separating agent and the like. The vapor phase contains hydrogen sulfide, water (water vapor), an organic amide solvent (vapor), a dihalo-aromatic compound (vapor) various thermally decomposed products and the like. If the polymerizer is purged with nitrogen before starting polymerization, a large amount of nitrogen will be contained in the vapor phase. A method in which the polymerization reaction system is stopped heating and gradually cooled after the polymerization process requires a long time for cooling.

Water vapor is contained in a vapor phase. When the water vapor is condensed and the condensate (water) is refluxed back into a liquid phase, the condensate is heated by a high-temperature liquid phase and is re-evaporated. Since the latent heat of evaporation of water at the re-evaporation is high, it may be considered that the liquid phase can be efficiently cooled. However, as the vapor phase contains a large amount of low boiling gas components such as hydrogen sulfide, nitrogen and alkyl mercaptans, it is not efficient to cool the gas component in the vapor phase to condense part of the gas component such as water vapor and reflux it.

The above described Japanese Patents No. 2604673 and No. 2604674 disclose a method for cooling the vapor phase part of a reactor is disclosed. Specifically, part of the vapor phase is condensed and the condensate is refluxed back into a liquid phase by cooling to a very low temperature, such as cooling by passing a coolant having a temperature of 20° C. through a coil wound around the upper part of the reactor. However, the method described in these patents is not adopted as a cooling method. In addition, it is not efficient as a method for condensing water vapor and the like contained in the vapor phase. Further, if the temperature of the upper part of the reactor is reduced too much, high-melting point substances such as a dihalo-aromatic compound contained in the vapor phase may deposit on the inner wall of the upper part of the reactor.

As a result of an intensive study to achieve the above described object, the inventors have hit upon a method in which in a cooling process, a gas component in a vapor phase is cooled and at the same time a low boiling gas component with a lower boiling point than water in the gas component is exhausted from the vapor phase of a polymerization reaction system, thereby reducing the content thereof.

It has been found that if the content of a low boiling gas component in a vapor phase is reduced, a high boiling gas component containing water vapor and the like can be efficiently condensed and the condensate can be refluxed back into a polymerization reaction system, for example, by cooling the gas component using a reflux condenser. Thus, when the condensate refluxed back into the polymerization reaction system is introduced into a liquid phase by dropping it on the liquid phase or the like and at least part of the condensate introduced into the liquid phase is re-evaporated, the entire polymerization reaction system including the liquid phase can be extremely efficiently cooled by a high latent heat of evaporation.

According to the method of the present invention, a high boiling gas component can be efficiently condensed and refluxed without substantially reducing the temperature of the coolant to be passed through a jacket of a reflux condenser, and the entire polymerization reaction system including a liquid phase can be rapidly cooled by utilizing the latent heat of evaporation required when the water and the like refluxed back into the liquid phase is re-evaporated. The present invention has been completed based upon these findings.

The present invention provides a method for producing a poly(arylene sulfide) in which a dihalo-aromatic compound and an alkali metal sulfide are polymerized by heating in an organic amide solvent, which comprises:

(1) after a polymerization process, providing a cooling process for cooling a polymerization reaction system comprising a liquid phase containing the poly(arylene sulfide) produced and the organic amide solvent and a vapor phase containing a gas component (A) and (2) in the cooling process, cooling the gas component (A) in the vapor phase and reducing the content of a low boiling gas component (A1), which has a lower boiling point than water and exists in the gas component (A), in the vapor phase of the polymerization system.

BEST MODE FOR CARRYING OUT THE INVENTION

1. Method for Polymerizing Poly(Arylene Sulfide)

Figure 1:
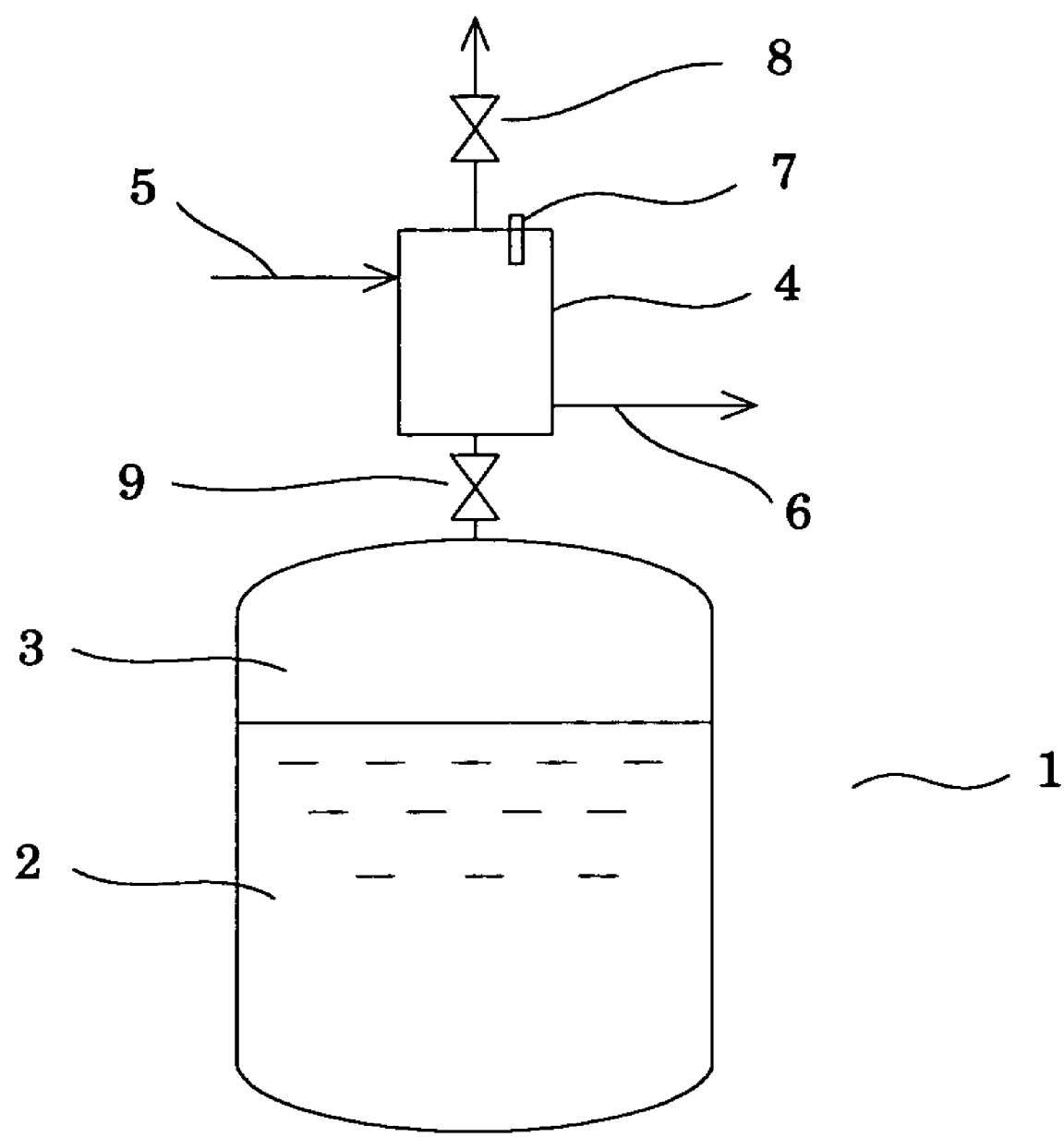
FIG. 1 is a sectional view showing a method for cooling a gas component in a vapor phase of a polymerization reaction system, using a reflux condenser.

Poly(arylene sulfide)s (PAS) can be synthesized by heating to polymerize dihalo-aromatic compounds and alkali metal sulfides in organic solvents. A polymerization reaction system can be added with phase separating agents, polymerization aids and the like as necessary.

(1) Alkali Metal Sulfide

Alkali metal sulfides used in the present invention include lithium sulfide, sodium sulfide, potassium sulfide, rubidium sulfide, cesium sulfide and mixtures of two or more thereof. These alkali metal sulfides can be used as hydrates, aqueous mixtures or anhydrides. Typical alkali metal sulfides such as sodium sulfide are generally commercially available as hydrates. The hydrates include, for example, sodium sulfide nonahydrate ($Na_2S \cdot 9H_2O$) and sodium sulfide pentahydrate ($Na_2S \cdot 5H_2O$). The alkali metal sulfides can also be prepared by in situ reaction of alkali metal hydrosulfides with alkali metal hydroxides in organic amide solvents.

Since a trace quantity of alkali metal hydrosulfides or alkali metal thiosulfates may be present in alkali metal sulfides as impurities, these trace components may be removed or converted to alkali metal sulfides by adding alkali metal hydroxides.

Among alkali metal sulfides, sodium sulfide and sodium hydrosulfide are particularly preferred in that they are less expensive.

In a process for producing PAS, when a large amount of water is present such as the water of hydration of alkali metal sulfides, water media in aqueous mixtures and the water by-produced from a reaction of alkali metal hydrosulfides with alkali metal hydroxides, the water is dehydrated in a dehydration process before a polymerization process.

(2) Dihalo-Aromatic Compound

The dihalo-aromatic compounds used in the present invention are those dihalo-aromatic compounds with two halogen atoms directly bonded to an aromatic ring. The dihalo-aromatic compounds include, for example, o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides and dihalodiphenyl ketones. A halogen atom denotes each atom selected from fluorine, chlorine, bromine and iodine. Two halogen atoms in the same dihalo-aromatic compound may be the same or different.

Specific examples of dihalo-aromatic compounds include p-dichlorobenzene, m-dichlorobenzene, 2,5-dichlorotoluene, p-dibromobenzene, 1,4-dichloronaphthalene, 1-methoxy-2,5-dichlorobenzene, 4,4'-dichlorobiphenyl, 3,5-dichlorobenzoic acid, 4,4'-dichlorodiphenyl ether, 4,4'-dichlorodiphenyl sulfone, 4,4'-dichlorodiphenyl sulfoxide and 4,4'-dichlorodiphenyl ketone. Among them, those mainly composed of p-dihalobenzenes typified by p-dichlorobenzene are preferred.

Dihalo-aromatic compounds may have one or more substituents such as carboxyl groups, hydroxy groups, nitro groups, amino groups and sulfonate groups. When they have a plurality of substituents, the substituents may be of a single type or of a combination of different types. These dihalo-aromatic compounds can be used each independently or in combination of two or more. When two or more dihalo-aromatic compounds are used, copolymers having two or more different structural units will be obtained. The copolymers include random copolymers, block copolymers and the like.

The dihalo-aromatic compounds are used in an amount of typically from 0.90 to 1.20 moles relative to one mole of charged alkali metal sulfides.

(3) Organic Amide Solvent

The present invention uses organic amide solvents as a solvent in a dehydration process, a polymerization process, a cooling process and the like.

The organic amide solvents are preferably stable under a basic condition at a high temperature. Specific examples of the organic amide solvents include amide compounds such as N,N-dimethylformamide and N,N-dimethylacetamide; N-alkyl pyrrolidone compounds or N-cycloalkyl pyrrolidone compounds such as N-methyl-ε-caprolactam, N-methyl-2-pyrrolidone (hereinafter abbreviated as "NMP") and N-cyclohexyl-2-pyrrolidone; N,N-dialkyl imidazolidinone compounds such as 1,3-dialkyl-2-imidazolidinones; tetraalkylurea compounds such as tetramethylurea; and hexalkylphosphoric triamide compounds such as hexamethylphosphoric acid triamide. These organic amide solvents can be used each independently or in combination of two types or more.

Among these organic amide solvents, N-alkyl pyrrolidone compounds, N-cycloalkyl pyrrolidone compounds and N,N-dialkyl imidazolidinone compounds are preferred, and in particular NMP, N-methyl-ε-caprolactam and 1,3-dialkyl-2-imidazolidinones are more preferred, NMP being most preferred.

The organic amide solvents used in the polymerization reaction of the present invention are used in an amount of typically from 0.1 to 10 kg per mole of charged alkali metal sulfides.

(4) Additive Components

Monohalo compounds may be used in a small quantity in order to allow formation of the terminals of produced PASs and adjust polymerization reaction and molecular weights. The monohalo compounds may be aromatic compounds or non-aromatic compounds.

In order to allow formation of branched or crosslinked polymers, polyhalo compounds to which 3 or more halogen atoms are bonded, active hydrogen-containing halogenated aromatic compounds, halogenated aromatic nitro compounds and the like can be used. Compounds other than aromatic compounds may also be used as the polyhalo compounds as branching and crosslinking agents, but aromatic compounds such as trihalobenzenes are preferred.

Organic sulfonic acid metal salts, lithium halides, organic carboxylic acid metal salts, alkali metal phosphates, alkaline earth metal phosphates, alkali metal sulfates, alkaline earth metal oxides, alkaline earth metal hydroxides and the like can be used as polymerization aids as appropriate. Many of these polymerization aids are functional as phase separation agents.

(5) Phase Separation Agent

In the polymerization process of PAS, phase separation agents may be contained in a reaction mixture so that polymerization reaction is promoted and the PAS with a high degree of polymerization can be obtained in a short time. Phase separation agents are used to induce liquid—liquid phase separation in the reaction mixture (liquid phase) in which polymerization reaction has proceeded to some extent into two phases of a polymer-rich phase (molten PAS phase) and a polymer-poor phase (organic amide solvent phase). The phase separation agents may be present in the reaction mixture from the beginning of the polymerization reaction, or may be added in the middle of the polymerization reaction. Further, the phase separation agents may be added to the reaction mixture after the completion of the polymerization reaction to form a liquid—liquid phase separation state, before cooling.

Specific examples of the phase separation agents include organic sulfonic acid metal salts, lithium halides, organic carboxylic acid metal salts, alkali metal phosphates, alkaline earth metal phosphates, alkali metal sulfates and water, generally known as polymerization aids for PAS. These phase separation agents can be used not only singly, but also in combination of two or more thereof. Among the phase separation agents, organic carboxylic acid metal salts such as lithium acetate and sodium acetate and water are preferred.

The phase separation agents are used in different amounts depending on the type of compounds, and are used in an amount of typically within the range from 0.01 to 10 moles relative to one mole of charged alkali metal sulfides.

(6) Dehydration Process

A dehydration process can be provided before a polymerization process, in order to adjust water content in a reaction mixture. The dehydration process is implemented by heating alkali metal sulfides in organic amide solvents desirably under an inert gas atmosphere and separating water outside the system by distillation. Alkali metal sulfides contain water exceeding the quantity required in the polymerization process because they are typically used as hydrates or aqueous mixtures. In addition, when alkali metal hydrosulfides are used as a sulfur source, approximately equimolar amount of alkali metal hydroxides are added, and they are reacted in situ in organic amide solvents to be converted to alkali metal sulfides. This conversion reaction forms water as a by-product.

In the dehydration process, water including such hydrating water (water of crystallization), aqueous media and by-produced water is partially eliminated into the required range of water content. In the dehydration process, the water content is reduced to a level where water content present in the polymerization process is generally from 0.3 to 5 moles, preferably from 0.5 to 2.4 moles relative to one mole of the charged alkali metal hydrosulfides. If in the dehydration process, the amount of water is reduced to a level lower than the above requirement, some water can be added before the polymerization process to adjust the water content to a desired level.

These raw materials are charged at a temperature ranging generally from room temperature to 300° C., preferably from room temperature to 200° C. Apart of the raw materials may be added during the dehydration operation. Organic amide solvents are typically used as the solvent in the dehydration process. The solvent to be used in the dehydration process is preferably the same organic amide solvent as used in the polymerization process, most preferably NMP. The solvent is used in an amount of generally from 0.1 to 10 kg per mole of charged alkali metal sulfides.

The apparatus for use in the dehydration process may be the same as the polymerization reaction apparatus (polymerizer) used in the polymerization process, or may be different from it. The apparatus may be of a batch process, a continuous process or a combination process of the both.

In the dehydration process, the charged mixture is heated at a temperature ranging generally 300° C. or less, preferably from 60 to 280° C., for generally from 15 minutes to 24 hours, preferably from 30 minutes to 10 hours. The method for heating includes a method for maintaining a constant temperature, a stepwise or a continuous temperature-increasing method, or a method in which the both methods are combined.

In the dehydration process, generally, part of the organic amide solvent is evaporated together with water by azeotropy. Water is exhausted as an azeotropic mixture with the organic amide solvent, or as water alone by separating the organic amide solvent and water by distillation. Further, hydrogen sulfide is also evaporated together with water or the azeotropic mixture of water and the organic amide solvent. The evaporated hydrogen sulfide is preferably recovered by an appropriate method such as a method in which it is absorbed into an aqueous alkali metal hydroxide solution, and reused as a sulfur source.

(7) Polymerization Process

In the polymerization process, a mixture containing the alkali metal sulfide and organic amide solvent, prepared after the dehydration process, is mixed with a dihalo-aromatic compound, and the resultant reaction mixture is then heated. The reaction mixture is prepared at a temperature ranging generally from 100 to 350° C., preferably from 120 to 350° C. The order of the mixing is not particularly limited, and both components are added either partly by a small amount, or all at once. Further, a hydrogen sulfide-absorbing solution for recovering hydrogen sulfide evaporated in the dehydration process may be mixed in an appropriate order. When the reaction mixture is prepared, the amount of the organic amide solvent or coexistent water may be adjusted, and further additives such as a polymerization aid and a phase separation agent may also be incorporated.

Thus, after the reaction mixture containing the organic amide solvent, the alkali metal sulfide, the dihalo-aromatic compound and the like is prepared, the reaction mixture is heated to subject the alkali metal sulfide and the dihalo-aromatic compound to salt elimination and polycondensation reactions. The polymerization reaction apparatus (polymerizer) is preferably of a material excellent in corrosion resistance that does not have an adverse effect such as decomposition on the reaction mixture or reaction products. The reaction apparatus is preferably composed of a titanium material for at least a wetted part.

The polymerization reaction, which proceeds by heating the reaction mixture in a polymerizer, is a thermal reaction in a closed system. The polymerization reaction may be performed under an inert gas atmosphere such as nitrogen, but the inert gas is not essential. The polymerization reaction of PAS is performed at a temperature generally from 100 to 350° C., preferably from 150 to 330° C. However, the method of the present invention is effective when the polymerization by heating is performed at an elevated-temperature of preferably 180° C. or higher, more preferably 200° C. or higher, most preferably 240° C. or higher.

The method for heating includes a method for maintaining a constant temperature, a stepwise or a continuous temperature-increasing method, or a method in which the both methods are combined. The polymerization reaction time is within the range of generally from 10 minutes to 72 hours, preferably from 30 minutes to 48 hours. The organic amide solvent for use in the polymerization process is within the range of generally from 0.1 to 10 kg, preferably from 0.15 to 1 kg per mole of charged alkali metal sulfides. The quantity may be changed during the polymerization reaction provided it is within this range.

The amount of coexistent water at the start of the polymerization reaction is within the range of generally from 0.3 to 5 moles, preferably from 0.5 to 2.4 moles relative to one mole of charged alkali metal hydrosulfides. In the preferred embodiment of the present invention, at any time from the start of polymerization to its completion, a phase separation agent can be added to produce a PAS having a relatively high molecular weight. Water is particularly desirable as the phase separation agent in terms of cost, ease of removal and the like.

When a liquid—liquid phase separation state is formed by increasing the content of the phase separation agent, the phase separation agent can be added at any time from the start of polymerization to its completion, the addition of water during polymerization being preferred.

A polymerization method in which the amount of water is increased as a phase separation agent during polymerization reaction preferably comprises a method wherein the polymerization is performed in a process with at least two steps comprising:

(I) a first step in which the polymerization is performed in a state where 0.5 to 2.4 moles of water are present per mole of the charged alkali metal sulfide, at a temperature of 180 to 235° C., to obtain a conversion of the dihalo-aromatic compound of 50 to 98% by mole; and (II) a second step in which the polymerization is continued by adding water so as to create a state where 2.5 to 7.0 moles of water are present per mole of the charged alkali metal sulfide, and increasing the temperature to 245 to 290° C.

The method of the present invention exerts its effect most significantly when water is added during the polymerization process as a phase separation agent to produce a reaction mixture containing a PAS having a relatively high molecular weight, which is then cooled.

In the mixture containing a PAS having a relatively high molecular weight, the molar ratio of water/NMP is within the range of preferably from 0.6 to 1.1, more preferably from 0.7 to 1.0, and the molar ratio of NMP/charged alkali metal sulfide is within the range of preferably from 2.3 to 5.5, more preferably from 2.5 to 4. Further, the molar ratio of dihaloaromatic compound/alkali metal sulfide before starting the polymerization process is within the range of preferably from 0.9 to 1.2, more preferably from 0.98 to 1.05. The number of moles of the charged alkali metal sulfide (also referred to as "S-component") is based on the number of moles of the alkali metal sulfide after the completion of the dehydration process.

2. Cooling Process

The production process of the present invention provides a cooling process for cooling the polymerization reaction system comprising a liquid phase containing the product PAS and the organic amide solvent and a vapor phase containing a gas component (A), after the polymerization process for PAS, wherein the gas component (A) in the vapor phase is cooled during the cooling process to simultaneously reduce the content of a low boiling gas component (A1), which has a lower boiling point than water and exists in the gas component (A), in the vapor phase of the polymerization system.

The polymerization reaction system at the completion of the polymerization process is a closed system in a high-temperature and high-pressure state. The liquid phase of the polymerization reaction system contains organic amide solvents, PAS produced, halogenated alkali metals (for example, NaCl), unreacted dihalo-aromatic compounds and the like. Meanwhile, the vapor phase contains a gas component (A) such as, for example, water (water vapor), hydrogen sulfide, nitrogen, oxygen, carbon dioxide, alkyl mercaptans, amines, alkylsulfides, lower hydrocarbons, unreacted dihalo-aromatic compounds (vapor) and organic amide solvents (vapor).

These gas components (A) contain, other than those added and mixed in the raw material preparation process, polymerization process and the like, newly produced components such as those produced by the thermal decomposition of organic amide solvents during the polymerization reaction at high-temperature and high-pressure, by the decomposition of alkali metal sulfides or by the reaction of hydrogen sulfide with other components. For example, when sodium sulfide is allowed to react with p-dichlorobenzene in a polymerizer purged with nitrogen to synthesize polyphenylene sulfide, the gas component (A) contains relatively large amount of nitrogen, hydrogen sulfide, water, methyl mercaptan and the like, and p-dichlorobenzene, NMP, carbon dioxide, dimethyl mercaptan and the like are also detected. Note that this formulation of the gas component is one example and it varies depending on the variation of the production conditions. For example, if the polymerizer is not purged with nitrogen gas, the content of nitrogen contained in the gas component in the vapor phase will be extremely low. However, even if the production conditions vary, hydrogen sulfide, water vapor and the like will still be contained in relatively large amount in the vapor phase.

The gas component (A) contains a large amount of a low boiling gas component (A1) such as hydrogen sulfide, alkyl mercaptans and nitrogen, which has a lower boiling point than water (100° C.). These low boiling gas components (A1) cannot be condensed to liquid by a conventional cooling method, so they may be referred to as "non-condensable gas component" in the present specification.

On the other hand, the gas component (A) contains generally relatively small amount of high boiling gas component (A2) with a boiling point equal to or higher than that of water, such as water, NMP and p-dichlorobenzene. The high boiling gas component (A2) is a vapor component (coherent component) that can be condensed to liquid by a conventional cooling method using coolant. Among the high boiling gas component (A2), when water (water vapor) is condensed by cooling and refluxed back into a polymerization reaction system, it is dropped in a liquid phase or reach the liquid phase along a polymerizer wall and is brought into contact with the high-temperature liquid phase to be evaporated. It has been found that since water absorbs a high latent heat of evaporation from the liquid phase when it is evaporated, the liquid phase is efficiently cooled.

However, heat transfer is insufficient only by cooling the gas component (A) because a large amount of low boiling point component (A1) is contained in the gas component (A) in the vapor phase, and so the high boiling point component (A2), the vapor component, cannot be efficiently condensed and refluxed. This will be described now using a method for cooling the gas component (A) in the vapor phase using a reflux condenser as an example.

FIG. 1 is a sectional view showing a method for cooling a gas component in a vapor phase of a polymerization reaction system, using a reflux condenser. After a polymerization process, a polymerization reaction system comprising a liquid phase 2 and a vapor phase 3 is formed in a closed polymerizer 1. A reflux condenser 4 is provided above the polymerizer 1. Coolant is passed through a jacket of the reflux condenser (detail being not shown) from a line 5 and exhausted from a line 6. A gas component (A) in a vapor phase 3 is introduced into the reflux condenser 4 from a valve 9. A thermometer 7 is mounted at the top of the reflux condenser 4. The exhaust valve 8 provided above the reflux condenser 4 is closed.

If the gas component (A) in the vapor phase 3 contains a large amount of low boiling gas component (A1) (non-condensable gas component), the efficiency of heat transfer will be extremely low and the efficiency of condensation of a high boiling gas component (A2) (vapor component) to liquid will be low, even when the gas component (A) is cooled by passing the coolant through the jacket of the reflux condenser. Further, when the high boiling gas component (A2) in the reflux condenser 4 starts to condense, the low boiling gas component (A1) accumulated within the reflux condenser 4 prevents the high boiling gas component (A2) from entering into the reflux condenser 4.

Therefore, the present invention adopts a method for cooling the gas component (A) in the vapor phase and reducing the content of the low boiling gas component (A1) with a lower boiling point than water in the gas component (A) in the vapor phase of a polymerization reaction system, in a cooling process. The method for reducing the content of the low boiling gas component (A1) in the gas component (A) includes a method for exhausting it from the polymerization reaction system, a method for allowing it to be absorbed in a liquid phase and a method in combination thereof.

A specific example of the method for exhausting the low boiling gas component (A1) from the polymerization reaction system includes a method in which it is exhausted from the exhaust valve 8 by opening the exhaust valve 8 provided above the reflux condenser 4 shown in FIG. 1. However, if the exhaust valve 8 is opened with no contrivance, the high boiling gas component (A2) containing water is also exhausted from the system together with the low boiling gas component (A1). Therefore, it is preferable to selectively exhaust the low boiling point component (A1) to reduce the content thereof. A more specific method thereof includes a method in which at least part of the high boiling gas component (A2) is condensed by the reflux condenser 4 and the condensate is refluxed back into the polymerization reaction system, thus increasing the concentration of the low boiling gas component (A1) in the upper part of the reflux condenser 4 before exhausting the low boiling gas component (A1) from the polymerization reaction system through the exhaust valve 8.

More specifically, after the polymerization process, heating to the polymerizer 1 is stopped and coolant is passed through the jacket of the reflux condenser 4 to start cooling of the gas component (A). The exhaust valve 8 is left closed. As the cooling is continued, the concentration of the low boiling gas component (A1) in the reflux condenser 4 will be increased. Then, the exhaust valve 8 is gradually opened and the low boiling gas component (A1) is exhausted from the system. The exhaust valve may be opened at the same time as the start of cooling by the reflux condenser, but in this case the valve is desirably gradually opened in a sufficiently long time. The exhaust of the low boiling gas component (A1) can be determined using the temperature indicated by the thermometer 7 mounted at the top of the reflux condenser 4 as an index. Namely, while the low boiling gas component (A1) is exhausted, the temperature indicated by the thermometer (outlet temperature) is low, for example, about 165° C. When the concentration of the low boiling gas component (A1) in the gas component (A) is significantly reduced and the high boiling gas component (A2) starts to be exhausted from the exhaust valve 8, the outlet temperature indicated by the thermometer will rise, for example, to 236° C. and condensate will start to be observed at the exhaust port. The exhaust valve 8 is closed at this point of time. This operation is performed once per batch, but may be performed two or more times as necessary. Further, the valve 9 provided in the line connecting the polymerizer 1 and the reflux condenser 4 may be opened after the polymerization process or left open during the polymerization process.

Thus, when the content of the low boiling gas component (A1) in the vapor phase 3 is reduced, the efficiency of heat transfer of the reflux condenser (heat exchanger) to the high boiling gas component (A2) is significantly enhanced to efficiently condense the high boiling gas component (A2) containing water in the reflux condenser 4 and reflux the condensate back into the polymerizer 1. The refluxed condensate such as water is introduced into the liquid phase 2. Typically, the condensate such as water is refluxed back into the polymerizer from the reflux condenser 4 and dropped on the liquid phase. The condensate, particularly water, introduced into the liquid phase that is still in a high-temperature state is heated by the liquid phase 2 to be re-evaporated. At this time, a high latent heat of evaporation of water reduces the temperature of the liquid phase 2.

The method for cooling the gas component (A) in the vapor phase is not limited to a method using a reflux condenser. External cooling or internal cooling can be used for cooling the gas component (A) in the vapor phase. For example, a method may be used in which coolant is passed through an internal coil provided in the vapor phase of the reactor or through an external coil in the upper part of the reactor. When a reflux condenser is not used, an exhaust port and an exhaust valve for the low boiling gas component (A1) can be provided at the top of a polymerizer. For exhausting the low boiling gas component (A1) from the system, it is preferable to use a reflux condenser in which the low boiling gas component (A1) is easily accumulated.

Significant improvement of the efficiency of heat transfer according to the method of the present invention eliminates the necessity to largely reduce the temperature of coolant (for example, cooling water) to be passed through a jacket of a reflux condenser or the like. Therefore, it is possible to prevent the deposition of dihalo-aromatic compounds in a vapor phase on a reflux condenser, an inner wall of a polymerizer or an inner coil by adjusting the temperature of the coolant in the range from higher than the melting point of the dihalo-aromatic compounds to lower than 100° C. When p-dichlorobenzene is used, the temperature of the coolant is more preferably adjusted around 55 to 70° C. If the deposition of the dihalo-aromatic compound is very improbable, the temperature of the coolant may be set lower than the above. Further, the temperature of the coolant may be changed during cooling.

A collection device storing an aqueous alkali metal hydroxide solution therein is preferably connected to the exhaust valve 8 located above the reflux condenser 4, and the low boiling gas component (A1) exhausted through the exhaust valve is bubbled into the aqueous solution to collect at least part of the low boiling gas component (A1) in the aqueous solution. According to this method, hydrogen sulfide in the low boiling gas component (A1) is collected.

The method for reducing the low boiling gas component (A1) in the vapor phase includes a method for allowing it to be absorbed in the liquid phase besides the above described method for exhausting it from the system. Specifically, addition of alkali metal hydroxides such as sodium hydroxide allows hydrogen sulfide in the low boiling gas component (A1) to be absorbed and immobilized as sulfides in the liquid phase. The alkali metal hydroxides are preferably added in the liquid phase as an aqueous solution or a mixture with water.

Addition of alkali metal hydroxides in the liquid phase increases the efficiency of heat exchange (coefficient of heat transfer) of the vapor component in the inner coil and external coil provided in the vapor phase of the reactor or the reflux condenser provided above the reactor. Therefore, a preferred amount of alkali metal hydroxides to be added is the amount that substantially no increase of the efficiency of heat exchange (coefficient of heat transfer) is observed. However, the amount of alkali metal hydroxides to be added can be increased within the range where the quality of the product is not adversely affected.

The absorption and immobilization of hydrogen sulfide in the liquid phase according to the above method alone largely improves the efficiency of heat transfer to the high boiling gas component (A2) and allows efficient condensation and reflux. Further, the content of the low boiling gas component (A1) in the vapor phase can be reduced by allowing at least part of the low boiling gas component (A1) to be absorbed in the liquid phase, and exhausting a residual low boiling gas component (A1) from the polymerization reaction system.

Water, dihalo-aromatic compounds and organic amides which are subjected to condensation and reflux are not removed from the reactor during the cooling process, but may be removed after the completion of the cooling process. Hydrogen sulfide in the low boiling gas component (A1) (non-condensable gas component) can be recovered and recycled. The operation for reducing the low boiling gas component (A1) in the vapor phase may be performed either by a batch operation in one or more times or by a continuous operation.

According to the present invention, the reduction of the low boiling gas component (A1) (non-condensable gas component) in the vapor phase dramatically increases the amount of heat transfer to the high boiling gas component (A2) (vapor component) in the vapor phase, and the effect of the heat removal by condensation and reflux allows cooling of the entire polymerization system including the liquid phase in a short time. The PAS obtained by the production method of the present invention is superior to conventional methods in terms of yield, quality and operability in washing, filtration and drying processes.

The cooling after the polymerization process, which is a cooling operation under high temperature and high pressure, can be performed generally by a reactor provided with a reaction vessel jacket, an internal heat exchanger, an external heat exchanger and the like, and a heat exchanger provided above the reactor. The cooling of the liquid phase may be performed in addition to the cooling of the gas component (A) in the vapor phase. The end point of the exhaust of the low boiling gas component (A1) (non-condensable gas component) from the system can be determined by a rapid increase of the temperature of the exhaust gas after passing through the heat exchanger (reflux condenser) provided in the vapor phase and easy solidification or liquefaction of condensing components in the exhaust gas, as described above.

In the cooling process, in the case of PPS, a gradual cooling according to the above described method is used to reduce the temperature of the liquid phase to about 155° C. This cooling temperature allows the PAS produced to become a granular solid and the liquid phase to become slurry. After this, the vapor phase may be released from the system; the liquid phase may be rapidly cooled; or water may be introduced into the liquid phase.

3. Recovery Process

After the cooling process, a washing process, a filtration process, a drying process and the like can be performed according to common procedures to recover a purified PAS. For example, a purified PAS can be obtained by separating the slurry of a cooled liquid phase by filtration as it is or after diluted with water. After the separation by filtration and screening, the PAS may be subjected to washing treatment with the same organic amide solvent as the one in polymerization, other organic solvents such as ketones and alcohols, hot water and the like. The PAS may also be treated with acid and salt such as ammonium chloride. According to the present invention, the PAS can be obtained in a granular form, so the treatment such as filtration, washing, drying or the like is easy.

The PAS obtained by the production method of the present invention can be molded to various injection moldings and extrusion moldings such as sheets, films, fibers and pipes, singly or compounded with inorganic fillers, fibrous fillers and various synthetic resins.

EXAMPLES

Hereinafter, the present invention will be more specifically described with reference to examples and comparative examples, but the present invention is not limited to these examples.

In the examples and comparative examples, the "product" means granular PPS obtained through the cooling process, washing process, filtration process for collecting granular polymers by a screen with an aperture of 150 μm (100 meshes) and drying process, after the completion of polymerization process.

The yield of the product was determined based on the theoretical value in the case where all of the sodium sulfide in the autoclave after subjected to dehydration process arranged in the former step of the polymerization process is reacted with p-dichlorobenzene to be converted to PPS.

Example 1

A Method for Removing Heat by Condensing and Refluxing Vapor Components after Purging Non-Condensable Gases 1. Dehydration Process A 20 liter autoclave (polymerizer) with an agitator is provided with an electric heater for allowing conduction heating from a side wall and a thermometer and a pressure gauge for detecting internal temperature and pressure respectively. A cylindrical reflux condenser with an inner diameter of 20 mm and a height of 250 mm is installed above the autoclave in an upright position.

Into the autoclave, 6,000 g of NMP and 3,800 g of sodium sulfide pentahydrate were charged, purged with nitrogen gas and allowed to gradually increase to a temperature of 200° C. while agitated, allowing evaporation of 1,650 g of water and 1,100 g of NMP. At this time, 0.50 mole of hydrogen sulfide ($H_2S$) was also evaporated. Sodium sulfide after the dehydration process were 22.04 moles.

Then, the autoclave was cooled to 180° C., and was added with 3,435 g of p-dichlorobenzene (abbreviated as "pDCB") {pDCB/$Na_2S$=1.06 (molar ratio)}, 2,815 g of NMP, 183 g of water {total water in the autoclave/$Na_2S$=1.40 (molar ratio)} and 13.3 g of sodium hydroxide of 97% purity so that the amount of sodium hydroxide becomes 6.00% by mole relative to sodium sulfide in addition to 1.00 mole of sodium hydroxide produced in the reactor by the evaporation of 0.5 mole of hydrogen sulfide.

2. Polymerization Process

The reactants were allowed to react at 220° C. for 4.5 hours while agitated with the agitator of the autoclave. Then, while continuing agitation, 457 g of water as a phase separation agent was injected into the autoclave {total water in the autoclave/$Na_2S$=2.55 (molar ratio)} and the reactants were raised to a temperature of 255° C. and allowed to react for 2.0 hours. The pressure inside the autoclave at the completion of polymerization was $1.75 \times 10^6$ Pa (gauge pressure). The time required in the polymerization process was 6.5 hours.

3. Cooling Process

After the completion of the polymerization, the power of the heater was turned off, and the gas outlet of the exhaust valve attached to the top of the reflux condenser was connected to a collection device with 200 g of a 5% aqueous sodium hydroxide solution therein. Before purging gas (exhausting gas components from the system), cooling water (about 60° C.) was passed through a jacket of the reflux condenser to start cooling.

Immediately after the above, the gas purge was performed over a 2-minute period by gradually opening the exhaust valve attached to the top of the reflux condenser. The temperature at the gas outlet of the condenser, which was 165° C. at the start of the gas purge, reached 236° C. at the completion of the gas purge. At this time, the temperature inside the autoclave was 243° C. and the pressure inside the autoclave was $1.37 \times 10^6$ Pa. Comparison of this value with the pressure at the same temperature in the case of no gas purge in Comparative Example 1 to be described below shows that the difference of the pressure inside the autoclave by the gas purge at this temperature corresponds to $0.07 \times 10^6$ Pa.

The time when the condensate was observed at the gas outlet of the reflux condenser was defined as the end point of the purge of the low boiling gas component (A1) (non-condensable gas component). The weight increase by the collected component absorbed in 200 g of a 5% aqueous sodium hydroxide solution was 1.2 g. In the collected component 0.46 g of hydrogen sulfide was detected. However, NMP and p-dichlorobenzene were not detected.

After the low boiling gas component (A1) was exhausted from the system, the exhaust valve of the reflux condenser was closed. The condensation and reflux of the high boiling gas component (A2) present in the vapor phase was further continued by cooling the gas component (A) in the vapor phase. In the cooling process, it took 44 minutes to cool the temperature of the liquid phase from 255° C. to 155° C. The pressure inside the autoclave at this time was $0.11 \times 10^6$ Pa.

4. Recovery Process

The obtained reaction mixture (liquid phase component) was added with acetone, and was washed and filtered three times respectively. Then, water at room temperature was added and washing was repeated four times. The thus obtained slurry was added with an aqueous acetic acid solution, and was washed and filtered. Further, washing was repeated four times, followed by recovering solids with a sieve.

The obtained wet resin was dried at 105° C. for 13 hours using a tray drier. The yield of PPS after drying was 2,169 g (91%).

Example 2

A Method for Removing Heat by Condensing and Refluxing Vapor Components While Immobilizing the Non-Condensable Gas in the Liquid Phase with a Mixture of Sodium Hydroxide and Water Added in the Liquid Phase In Example 1, a mixture of 100 g of sodium hydroxide and 200 g of water was injected into the autoclave after polymerization. It took three minutes for the injection, and the temperature inside the autoclave became 250° C. and the pressure inside the autoclave became $1.52 \times 10^6$ Pa. After the completion of the injection, cooling was started by passing cooling water through the jacket of the reflux condenser. In this manner, the low boiling gas component (A1) was absorbed and immobilized from the vapor phase into the liquid phase, and at the same time the condensation and reflux of the high boiling gas component (A2) was continued. The operation after the cooling was performed in the same manner as in Example 1, and dry PPS was recovered. In this method, the time required for reaching 155° C. from the start of the cooling of the liquid phase was 48 minutes. The pressure inside the autoclave at this time was $0.07 \times 10^6$ Pa.

Comparative Example 1

A Method for Removing Heat by Condensing and Refluxing Vapor Components without Purging Non-Condensable Gas and without Immobilizing it in the Liquid Phase Everything was performed in the same manner as in Example 1 except that the low boiling gas component (A1) (non-condensable gas component) was not exhausted from the system, and dry PPS was recovered. The time required for reaching 155° C. from the start of the cooling of the liquid phase (255° C.) was 203 minutes. The pressure inside the autoclave at this time was $0.15 \times 10^6$ Pa. The pressure inside the autoclave at the temperature inside the autoclave of 243° C. was $1.44 \times 10^6$ Pa.

Comparative Example 2

A Method for Removing Heat Only by Ambient Cooling without Passing Cooling Water Through the Condenser for the Purpose of Condensing and Refluxing Vapor Components, without Purging Non-Condensable Gas and without Immobilizing it in the Liquid Phase Everything was performed in the same manner as in Example 1 except that the low boiling gas component (A1) (non-condensable gas component) was not purged from the autoclave and the cooling water was not passed through the jacket of the reflux condenser, and dry PPS was recovered. The time required for reaching 155° C. from the start of the cooling of the liquid phase (255° C.) was 272 minutes. The pressure inside the autoclave at this time was $0.15 \times 10^6$ Pa.

Comparative Example 3

A Method of Cooling Utilizing the Heat of Evaporation by Purging a Large Amount of Gas Charge, dehydration and polymerization were performed in the same manner as in Example 1. After the completion of polymerization, the low boiling gas component (A1) (non-condensable gas component) was not purged from the autoclave; cooling water was not passed through the jacket of the reflux condenser; and the system was gradually cooled at a cooling rate of 1° C./minute to 200° C. the pressure at the time of 200° C. was $0.47 \times 10^6$ Pa. Degassing was performed by opening the exhaust valve. The degassing took 10 minutes. The pressure and temperature inside the autoclave became $0.08 \times 10^6$ Pa and 144° C. respectively. The time required for reaching 155° C. from the start of the degassing was 8 minutes. The pressure inside the autoclave at 155° C. was 0.11× $10^6$ Pa.

Comparative Example 4

A Method for Removing Heat by Condensing and Refluxing Vapor Components by Passing Cooling Water Through the Condenser, by Adding Only Water in the Liquid Phase in Example 1, 200 g of water was charged into the autoclave after the completion of polymerization. It took two minutes for the charge, and the temperature and pressure inside the autoclave became 251° C. and 1.77×$10^6$ Pa respectively. After the completion of the charge, cooling water was passed through the jacket of the reflux condenser to start cooling. The operation after the cooling was performed in the same manner as in Example 1, and dry PPS was recovered. The time required for reaching 155° C. from the start of the cooling was 222 minutes. The pressure inside the autoclave at this time was 0.18×$10^6$ Pa.

The above results are shown in Table 1.

TABLE 1

|  | Examples | | Comparative Examples | | | |
| --- | --- | --- | --- | --- | --- | --- |
|  | 1 | 2 | 1 | 2 | 3 | 4 |
| Cooling time (minutes) | | | | | | |
| From the start of cooling to 155° C. | 44 | 48 | 203 | 272 | 63 | 222 |
| From the completion of polymerization to 155° C. | 44 | 51 | 203 | 272 | 63 | 224 |
| Yield (%) | 91 | 89 | 91 | 91 | 88 | 90 |

INDUSTRIAL APPLICABILITY

According to the method of the present invention, it has become possible to significantly reduce the time required in the cooling process by reducing a low boiling gas component (non-condensable gas component) in a vapor phase, and condensing a high boiling gas component (vapor component) and refluxing the condensate back into a polymerizer (polymerization reaction system) to cool the entire polymerization reaction system comprising a liquid phase, using a simple apparatus and a method after the completion of the polymerization process. As a result, it has been achieved to reduce the time required for producing a PAS. Thus, the present invention provides a method for efficiently and economically producing the PAS by rapidly cooling the polymerization reaction system after the polymerization process of the PAS.

The invention claimed is:

1. A method for producing a poly (arylene sulfide) in which a dihalo-aromatic compound and an alkali metal sulfide are polymerized by heating in an organic amide solvent in a polymerizer, which comprises:
   (1) after the polymerization process, initiating a cooling process for cooling a polymerization reaction system comprising a liquid phase containing the poly(arylene sulfide) produced and the organic amide solvent and a vapor phase containing a gas component (A); and
   (2) in the cooling process,
   (i) cooling the gas component (A) in the vapor phase in a reflux condenser provided above the polymerizer and equipped with a jacket through which coolant is passed, wherein vapor phase from the polymerization reaction system passes through a valve to the reflux condenser, and wherein an exhaust valve is located above the reflux condenser, thereby condensing a high boiling gas component (A2) with a boiling point equal to or higher than water, which is present in the vapor phase and includes water vapor, an unreacted dihalo-aromatic compound and the organic amide solvent,
   (ii) refluxing the condensate back into the polymerization reaction system, and thereby cooling the polymerization reaction system comprising the liquid phase, and
   (iii) reducing the content of a low boiling gas component (A1), which has a lower boiling point than water and exists in the gas component (A) in the vapor phase of the polymerization system, by
   a) exhausting the low boiling gas component (A1) from the polymerization system through the exhaust valve located above the reflux condenser;
   b) allowing at least a part of the low boiling gas component (A1) to be absorbed in the liquid phase by adding an alkali metal hydroxide into the liquid phase to react at least a part of the low boiling gas component (A1) with the alkali metal hydroxide in the liquid phase; or
   c) both a) and b),
   wherein a gradual cooling by the above cooling process is conducted to reduce the temperature of the liquid phase such that the liquid phase becomes slurry containing a granular solid of the poly (arylene sulfide).

2. The production method according to claim 1, wherein the low boiling gas component (A1) contains hydrogen sulfide.

3. The production method according to claim 1, wherein the condensate refluxed back into the polymerization reaction system is introduced into the liquid phase, and the polymerization reaction system comprising the liquid phase is cooled by the latent heat of evaporation required for re-evaporation of at least part of the condensate introduced into the liquid phase.

4. The production method according to claim 1, wherein in the cooling process, after the content of the low boiling gas component (A1) in the vapor phase is reduced, the operation in which the gas component (A) in the vapor phase is cooled to condense the high boiling gas component (A2) and reflux the condensate back into the polymerization system is further continued.

5. The production method according to claim 1, wherein the concentration of the low boiling gas component (A1) in the upper part of the reflux condenser is increased by condensing at least part of the high boiling gas component (A2) and refluxing the condensate back into the polymerization reaction system by the reflux condenser, and then the low boiling gas component (A1) is exhausted from the polymerization reaction system.

6. The production method according to claim 1, wherein a collection device storing an aqueous alkali metal hydroxide solution therein is connected to the exhaust valve located above the reflux condenser, and the low boiling gas component (A1) exhausted through the exhaust valve is bubbled into said aqueous solution to collect at least part of said low boiling gas component (A1) in said aqueous solution.

7. The production method according to claim 1, wherein the reflux condenser has a structure comprising a jacket through which coolant is passed, and the temperature of the coolant to be passed through the jacket is adjusted from higher than the melting point of the dihalo-aromatic compound to lower than 100° C. to cool the gas component (A).

8. The production method according to claim 1, wherein in the polymerization process, the dihalo-aromatic compound and the alkali metal sulfide are polymerized by heating in an organic amide solvent in a polymerizer to produce a heated and pressurized polymerization reaction system comprising a liquid phase heated to a temperature of 200° C. or higher.

9. The production method according to claim 1, wherein in the polymerization process, the dihalo-aromatic compound and the alkali metal sulfide are polymerized by heating in an organic amide solvent in the presence of a phase separation agent.

10. The production method according to claim 9, wherein the phase separation agent is water.

11. The production method according to claim 1, wherein in the polymerization process, the polymerization is performed in a process with at least two steps comprising:
   (I) a first step in which the polymerization is performed in a state where 0.5 to 2.4 moles of water are present per mole of the charged alkali metal sulfide, at a temperature of 180 to 235° C., to obtain a conversion of the dihalo-aromatic compound of 50 to 98% by mole; and
   (II) a second step in which the polymerization is continued by adding water so as to create a state where 2.5 to 7.0 moles of water are present per mole of the charged alkali metal sulfide, and increasing the temperature to 245 to 290° C.

12. The production method according to claim 1, wherein a phase separation agent is added to the polymerization reaction system after the polymerization process and before the cooling process.

13. The production method according to claim 1, wherein the poly(arylene sulfide) produced is recovered from the liquid phase after the cooling process.

14. The production method according to claim 1, wherein the polymerization process is performed at a temperature of 240° C. or higher, and wherein the cooling process reduces the temperature of the liquid phase to about 155° C.

15. The production method according to claim 1, wherein the low boiling gas component (A1) is exhausted through the exhaust valve located above the reflux condenser until a condensate is observed at the exhaust valve.

16. The production method according to claim 1, wherein the temperature of the coolant to be passed through the jacket of the reflux condenser is adjusted to a temperature of lower than 100° C.

* * * * *